US009506516B2

(12) United States Patent
Troester et al.

(10) Patent No.: US 9,506,516 B2
(45) Date of Patent: Nov. 29, 2016

(54) ELECTRONIC WEAR PIN-ACTIVE MEASUREMENT: THREADED WEAR PIN TO RING GEAR

(71) Applicant: HONEYWELL INTERNATIONAL INC., Morristown, NJ (US)

(72) Inventors: Jeffrey Troester, Granger, IN (US); Christian D. Brinkley, Plymouth, MN (US); Stephen Handel, Gilbert, AZ (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 0 days.

(21) Appl. No.: 14/689,336

(22) Filed: Apr. 17, 2015

(65) Prior Publication Data
US 2016/0305499 A1 Oct. 20, 2016

(51) Int. Cl.
F16D 66/02 (2006.01)

(52) U.S. Cl.
CPC .................. F16D 66/02 (2013.01)

(58) Field of Classification Search
CPC .... F16D 65/183; F16D 65/568; F16D 66/02; F16D 66/026
USPC .................... 188/1.11 L, 1.11 E, 1.11 W
See application file for complete search history.

(56) References Cited

U.S. PATENT DOCUMENTS

| 5,410,293 | A | 4/1995 | Angerfors | |
|---|---|---|---|---|
| 6,276,494 | B1* | 8/2001 | Ward | F16D 65/183 188/1.11 L |
| 8,464,842 | B2* | 6/2013 | Cahill | F16D 66/026 188/1.11 L |
| 2005/0252727 | A1* | 11/2005 | England | F16D 65/568 188/1.11 L |
| 2006/0090968 | A1 | 5/2006 | Taylor et al. | |
| 2006/0201755 | A1* | 9/2006 | McCann | F16D 65/568 188/71.7 |

FOREIGN PATENT DOCUMENTS

CN 103791009 A 5/2014
EP 0789156 B1 6/2001

* cited by examiner

Primary Examiner — Christopher Schwartz
(74) Attorney, Agent, or Firm — Shimokaji IP

(57) ABSTRACT

A brake monitoring system comprises a wear pin that is operatively connected to a brake to be monitored, wherein the wear pin can translate along a longitudinal axis of the wear pin and not rotate about the longitudinal axis; a wear gear rotationally affixed to the wear pin to enable the wear gear to rotate as the wear pin translates; and a counting device operatively adjacent the wear gear, wherein the counting device measures one of an amount of rotation of the wear gear and a rate of rotation of the wear gear.

17 Claims, 3 Drawing Sheets

ELECTRONIC WEAR PIN-ACTIVE MEASUREMENT: THREADED WEAR PIN TO RING GEAR

BACKGROUND OF THE INVENTION

The present invention generally relates to apparatus and methods for monitoring brake wear and, more particularly, for non-visual and remote monitoring of brake wear.

Current state of the art for aerospace monitoring of brake wear requires a visual inspection of each brake. The inspection includes visually identifying a wear pin mechanism and determining the life left on the brakes through the amount of pin that is visible. The wear pin is a mechanical system, including a rod attached to a pressure plate. As the brake wears and becomes thinner, a pressure plate moves and the wear pin (attached to the pressure plate) is pulled towards an axis of a heat sink. This rod becomes less visible as the brakes wear. However, the design does not enable the electronic sending of brake life indication to a remote user, such as someone in a cockpit. This manual visualization also requires manual data entry into electronic systems to determine wear rates. The visual inspection is also subject to operator misinterpretation.

As can be seen, there is need for an apparatus and method for automated, remote non-visual monitoring of brake wear.

SUMMARY OF THE INVENTION

In one aspect of the present invention, a brake monitoring system comprises a wear pin that is operatively connected to a brake to be monitored, wherein the wear pin can translate along a longitudinal axis of the wear pin and not rotate about the longitudinal axis; a wear gear rotationally affixed to the wear pin to enable the wear gear to rotate as the wear pin translates; and a counting device operatively adjacent the wear gear, wherein the counting device measures one of an amount of rotation of the wear gear and a rate of rotation of the wear gear.

In another aspect of the present invention, a brake monitoring system comprises a wear pin that is operatively connected to a brake to be monitored, wherein the wear pin can translate in a direction towards the brake; a wear gear affixed to the wear pin, wherein the wear gear can rotate about and not translate in the directions towards the brake as the wear pin translates; and a counting device operatively adjacent the wear gear, wherein the counting device measures one of an amount of rotation of the wear gear and a rate of rotation of the wear gear.

In yet another aspect of the present invention, a braking system comprises a brake; a pressure plate operatively engaged to the brake; a wear pin operatively connected to the brake, wherein the wear pin can translate in a direction towards the pressure plate; a wear gear rotationally affixed to the wear pin, wherein the wear gear is prevented from translation in the direction towards the pressure plate; and a counting device operatively adjacent the wear gear, wherein the counting device measures one of an amount of rotation of the wear gear and a rate of rotation of the wear gear.

These and other features, aspects and advantages of the present invention will become better understood with reference to the following drawings, description and claims.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

Various inventive features are described below that can each be used independently of one another or in combination with other features. However, any single inventive feature may not address any of the problems discussed above or may address only one of the problems discussed above. Further, one or more of the problems discussed above may not be fully addressed by any of the features described below.

The present invention generally provides an automated, brake monitoring/inspection system that omits the need for visual inspection and thereby enables a remote user, such as the operator of a vehicle, to monitor brake wear. The brake system can include a wear gear in which a wear pin threaded. A wear pin rotates the wear gear as a brake wears. In turn, the wear gear rotation correlates to the amount of brake wear. The system may be employed for each brake on a vehicle such as an aircraft, and be housed and sealed within a wheel housing of the aircraft.

Figure 1:
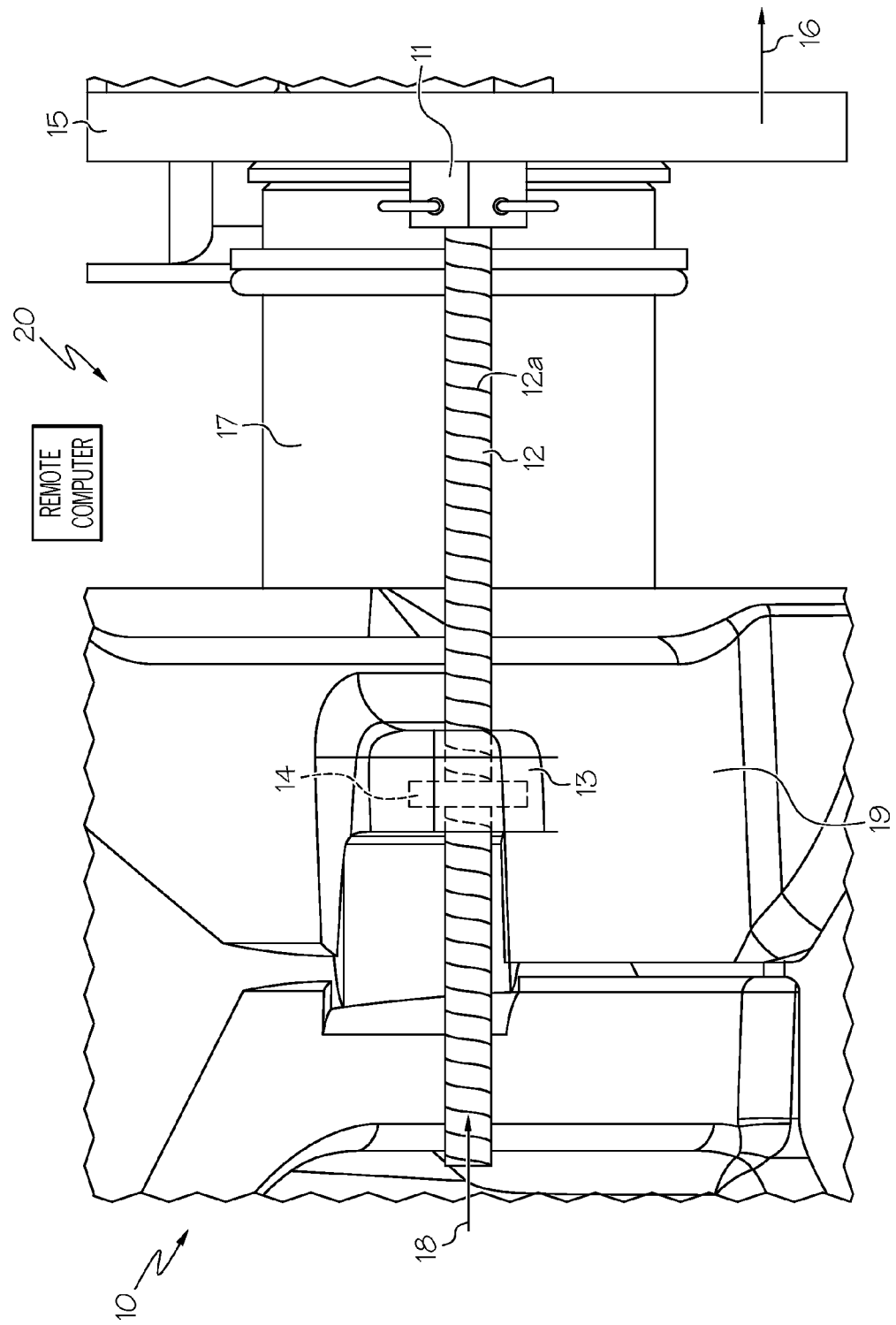
FIG. 1 is a plan, elevated view of a wear brake monitoring system according to an exemplary embodiment of the present invention.

FIG. 1 is an elevated plan view of an exemplary embodiment of a brake wear monitoring system 10 according to the present invention. The system may include a wear pin 12 operatively connected to a brake to be monitored and/or inspected (not shown), and a wear gear 14 that rotationally holds the wear pin 12. In an embodiment, the wear pin 12 can be operatively connected to the brake by a fastener 11 that may be affixed to a pressure plate 15 that interfaces the brake to be monitored and/or inspected.

The wear pin 12 can be cylindrical in shape, with one end affixed to the fastener 11. The other end of the wear pin 12 is not affixed and can move longitudinally along a longitudinal axis of the wear pin 12. The wear pin 12 can have an exterior surface with threads 12a thereon.

Figure 3:
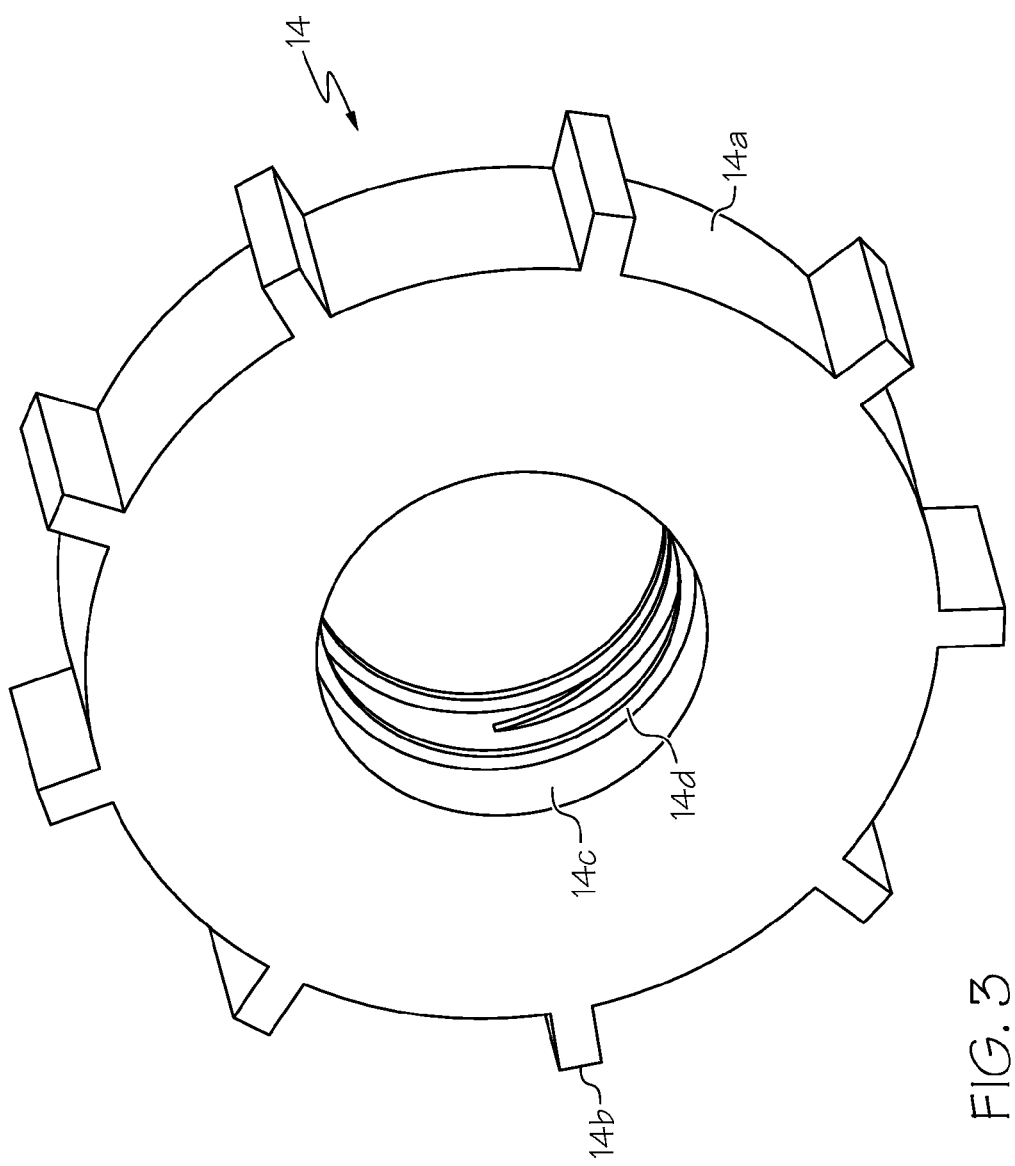
FIG. 3 is a perspective view of a wear gear according to an exemplary embodiment of the present invention.

The wear gear 14 may be rotatably engaged/affixed to the wear pin 23 at a point intermediate the two ends of the wear pin. As better seen in FIG. 3, the wear gear 14 may have a ring or donut shape with an outboard edge or surface 14a and an inboard edge or surface 14c. Tabs or notches 14b may extend radially away from the outboard edge 14a and be equally spaced apart circumferentially around the outboard edge 14a. The number of tabs 14b can vary, depending on the degree of fidelity or accuracy selected for monitoring. A higher degree of fidelity can require a larger number of tabs 14b. The inboard edge 14c can have threads 14d thereon. The threads 14d can match the threads 12a on the wear pin 12 to enable the wear gear 14 to rotate, as further described below.

Figure 2:
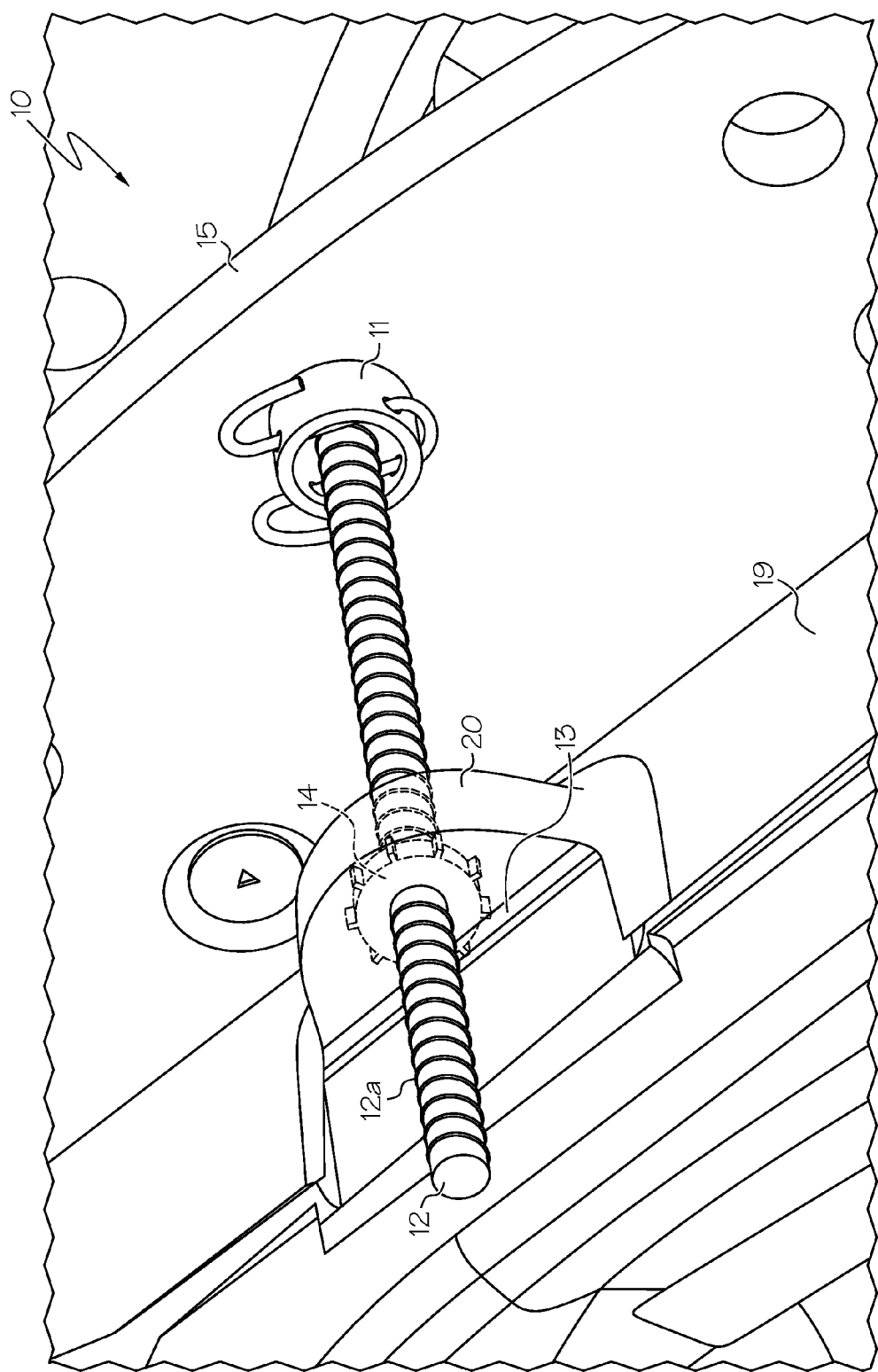
FIG. 2 is a perspective view of the embodiment shown in FIG. 1.

As seen in FIG. 2, the monitoring system 10 may further include a wear gear housing 20 within which the wear gear 14 may be positioned in and prevented from translation along the longitudinal axis of the wear pin 23. The system 10 may additionally include a counting device 13 within the housing 20. The counting device 13 may be able to measure the amount and/or rate of rotation of the wear gear 14. The counting device 13 can be of conventional design such as the Honeywell RPN Series Hall-Effect Rotary Position Sensor shown in http://sensing.honeywell.com/honeywell-sensing-and-control-product-search?sid=14C8FFF0E158&pNo=0&Nitk=si all products&N=1235&Ntt=rpn%20series and which is incorporated herein in its entirety. The housing 20, the wear gear 14, and the counting device 13 may be supported on a piston housing 19.

In operation, a piston 17, within the piston housing 19, can provide a continuing positive pressure on the pressure plate 15 which operatively interfaces/engages the brake to be monitored/inspected. As the brake to be monitored/inspected wears, the pressure plate 15 moves/translates in a direction of wear 16 (FIG. 1). The direction of wear 16 is towards the brake and can be substantially parallel to the longitudinal axis of the wear pin 12. The amount by which the pressure plate 15 moves may correlate to the amount of brake wear.

As the pressure plate 15 moves in the wear direction 16, the wear pin 12 may translate or move longitudinally along its longitudinal axis in a translation direction 18 (FIG. 2), though the wear pin 12 may not rotate. This translation occurs by virtue of one end of the wear pin 12 being affixed to the pressure plate 15 via the fastener 11. The amount by which the wear pin 12 translates or moves longitudinally can correlate to the amount of brake wear.

As the wear pin 12 translates in direction 18, but does not rotate about its longitudinal axis, the wear gear 14 may rotate about the wear pin 12, but does not translate along the longitudinal axis of the wear pin 12. The rotation of the wear gear 14, operatively adjacent to the counting device 13, can allow the counting device 13 to measure the rotation amount and/or rotation rate of the wear gear 14. In embodiments, the rotation of wear gear 14 can cause the tabs 14*b* to move by the counting device 13 operatively adjacent the wear gear 14. In turn, the counting device 13 may count the number of tabs 14*b* that moved by it, as well as count or measure the time between tabs passing the counting device 13 (which may change over time).

In an embodiment, the number of tabs 14*b* may be from about ten to 20 where in the circumference of the outboard edge of the wear gear 14 may be from about 0.2 inches to about 0.3 inches. Thereby, the spacing between tabs 14*b* may be from about 0.06 inches to about 0.19 inches. In such embodiment, each tab 14*b* counted by the counting device 13 may represent from about 5% to about 10% amount of brake wear.

The counting device may wirelessly transmit the counted data (i.e., rotation amount and/or rotation time) to a computer 20 (FIG. 1) accessible by a remote user. The computer 20 may be located where the remote user is located, such as in a cockpit. The computer 20 may have a database that enables a user to correlate the number of counted tabs with the amount of brake wear. The database may also enable a user to correlate the amount of time between counted tabs with a rate of brake wear.

It should be understood, of course, that the foregoing relates to exemplary embodiments of the invention and that modifications may be made without departing from the spirit and scope of the invention as set forth in the following claims.

We claim:

1. A brake monitoring system, comprising:
   a threaded wear pin that is operatively connected to a brake to be monitored, wherein the wear pin can translate along a longitudinal axis of the wear pin and not rotate about the longitudinal axis;
   a wear gear rotationally affixed circumferentially about an exterior of the wear pin to enable the wear gear to rotate circumferentially about the wear pin as the wear pin translates; and
   a counting device operatively adjacent the wear gear, wherein the counting device measures one of an amount of rotation of the wear gear and a rate of rotation of the wear gear.

2. The system of claim 1, wherein the wear pin is operatively connected to a pressure plate that interfaces the brake to be monitored.

3. The system of claim 2, wherein the wear pin is operatively connected, through a fastener, to the pressure plate.

4. The system of claim 1, wherein the wear pin includes an end operatively connected to the brake that prevents rotation of the pin.

5. The system of claim 4, where the end is operatively connected, through a pressure plate, to the brake.

6. The system of claim 1, wherein the wear pin translates along the longitudinal axis in a direction of brake wear.

7. The system of claim 1, wherein the wear pin translates in a direction of brake wear as a piston translates in the direction of brake wear.

8. The system of claim 1, wherein the wear pin is operatively connected to a piston that is operatively connected to the brake to be monitored.

9. A brake monitoring system, comprising:
   a wear pin, in the form of a rod having threads on an exterior surface thereof, that is operatively connected to a brake to be monitored, wherein the wear pin can translate in a direction towards the brake;
   a wear gear, in the form of a ring having threads on an inboard surface thereof, wherein the wear pear threads are engaged to the wear pin threads, wherein the wear gear can rotate about the wear pin and not translate in the directions towards the brake as the wear pin translates; and
   a counting device operatively adjacent the wear gear, wherein the counting device measures one of an amount of rotation of the wear gear and a rate of rotation of the wear gear.

10. The system of claim 9, wherein the wear gear is rotatably engaged to the wear pin at a point intermediate two ends of the wear pin.

11. The system of claim 9, wherein the wear gear includes tabs on an outboard surface thereof.

12. A braking system, comprising:
   a brake;
   a pressure plate operatively engaged to the brake;
   a wear pin operatively connected to the brake, wherein the wear pin can translate in a direction towards the pressure plate;
   a wear gear, in the form of a ring, rotationally affixed around the wear pin, wherein the wear gear is prevented from translation in the direction towards the pressure plate;
   a counting device operatively adjacent the wear gear, wherein the counting device measures one of an amount of rotation of the wear gear and a rate of rotation of the wear gear.

13. The system of claim 12, further comprising a piston operatively engaged to the pressure plate.

14. The system of claim 12, wherein the pressure plate moves in a direction of wear as the brake wears.

15. The system of claim 12, wherein the wear pin moves in a direction of wear as the brake wears.

16. The system of claim 12, wherein the wear gear rotates as the brake wears.

17. The system of claim 12, wherein the wear gear rotates as the wear pin translates.

* * * * *